Aug. 24, 1948.　　　K. B. BRITTON　　　2,447,730
GEAR SHIFTING MECHANISM
Filed Oct. 18, 1943　　　4 Sheets-Sheet 1
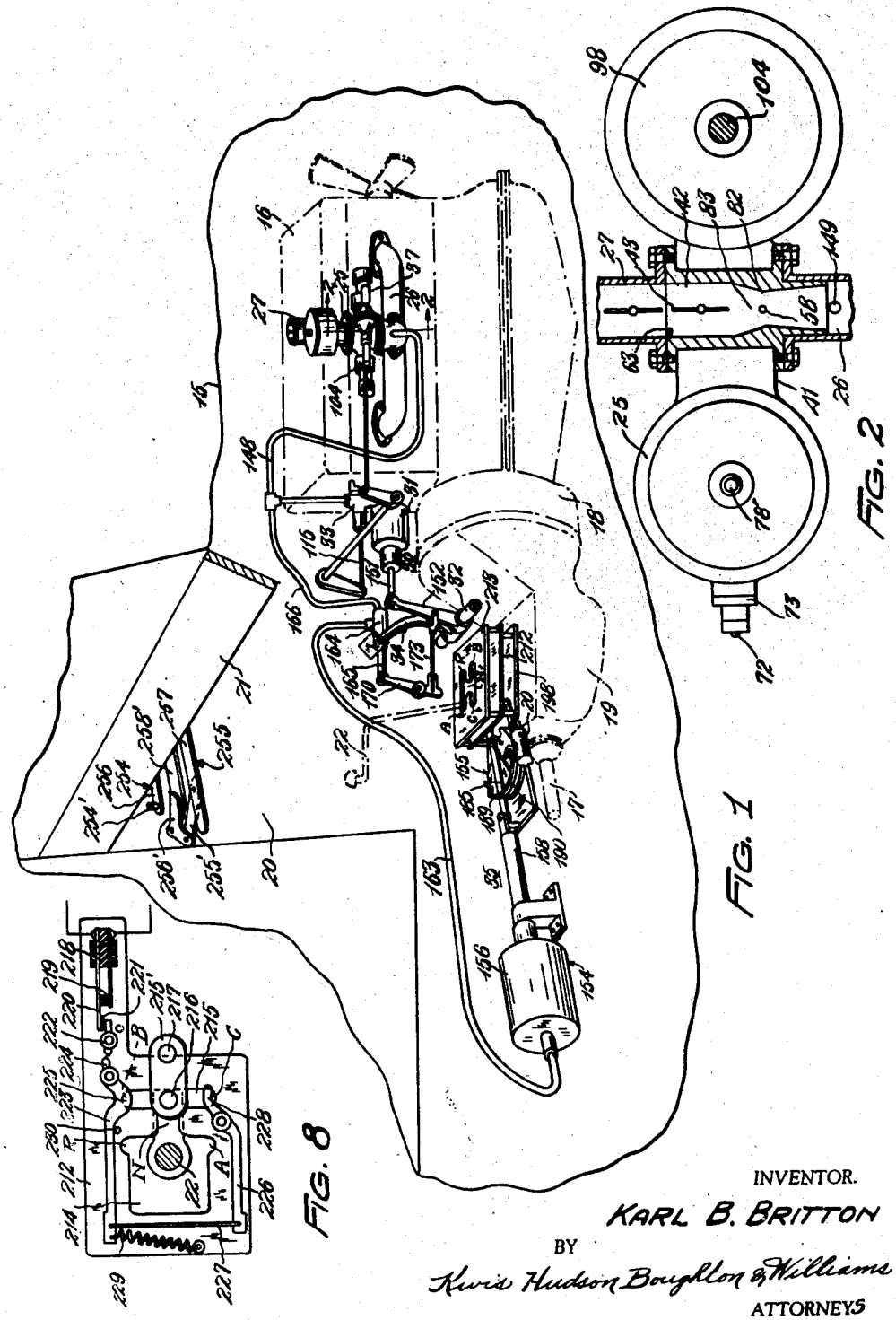
INVENTOR.
KARL B. BRITTON
BY
Kwis Hudson Boughton & Williams
ATTORNEYS

INVENTOR.
KARL B. BRITTON

Aug. 24, 1948.  K. B. BRITTON  2,447,730
GEAR SHIFTING MECHANISM
Filed Oct. 18, 1943  4 Sheets-Sheet 3

INVENTOR.
KARL B. BRITTON
BY
ATTORNEYS

Aug. 24, 1948.  K. B. BRITTON  2,447,730
GEAR SHIFTING MECHANISM
Filed Oct. 18, 1943  4 Sheets-Sheet 4
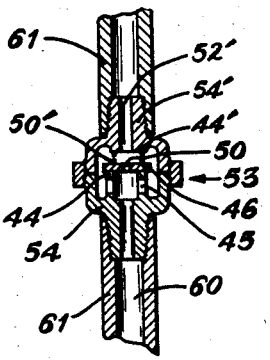
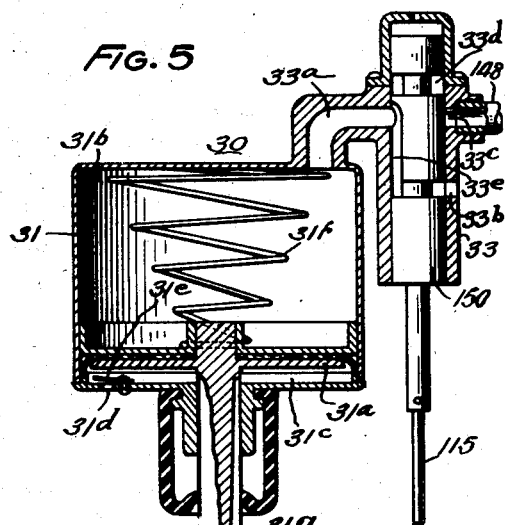
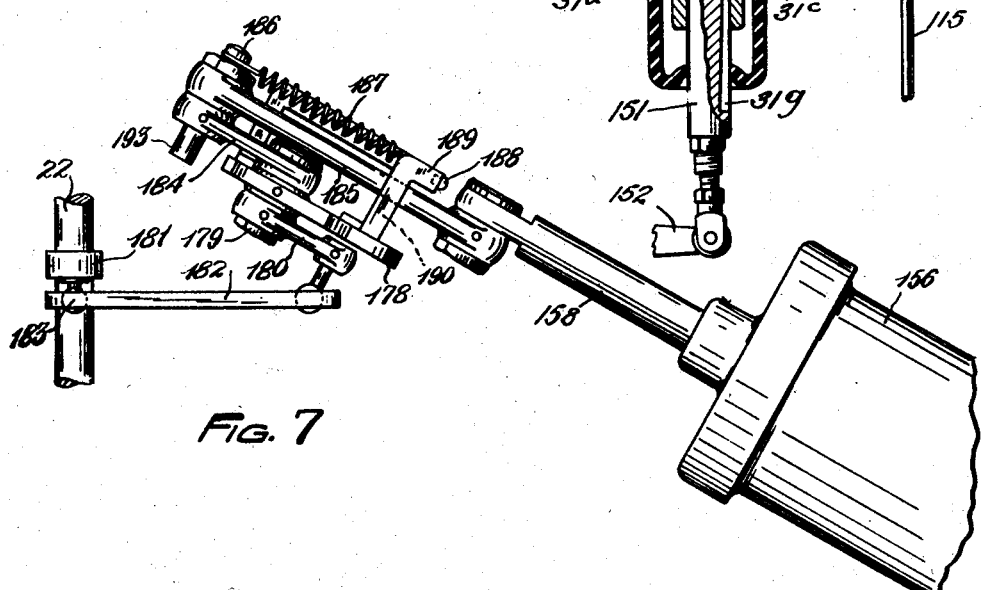
INVENTOR.
KARL B. BRITTON
BY
Kwis Hudson Boughton & Williams
ATTORNEYS Patented Aug. 24, 1948

2,447,730

UNITED STATES PATENT OFFICE 2,447,730

GEAR SHIFTING MECHANISM

Karl B. Britton, Cleveland, Ohio

Application October 18, 1943, Serial No. 506,700

9 Claims. (Cl. 74—472)

This invention relates to speed control apparatus which is automatically operable to vary the power transmission ratio of a variable transmission, and more particularly to apparatus of this kind which is adapted for use on motor vehicles.

An object of the present invention is to provide novel mechanism for automatically determining the time and nature of changes needed in a power transmission ratio in accordance with existing speed and load conditions.

Another object of the invention is to provide control apparatus for a motor vehicle, comprising novel mechanism for automatically determining when a change is needed in the power transmission ratio in accordance with existing speed and load conditions and automatically effecting the needed change.

Another object of the invention is to provide a novel mechanism which is responsive to the pressure and velocity of the intake fluid of an internal combustion engine, or to either of these functions of the intake fluid, and which automatically determines when a change should be made in the power transmission ratio and the nature of the change needed.

Still another object of this invention is to provide speed change apparatus for a motor vehicle, embodying mechanism which automatically determines needed changes in the power transmission ratio in accordance with changes occurring in the pressure or velocity of the intake of the motor, and mechanism for automatically changing the power transmission ratio in accordance with the determined needed changes.

The principal object of my invention is to provide a speed control apparatus constituting an improvement over the apparatus disclosed in my Patent No. 2,187,824, dated January 23, 1940, said apparatus having all of the above described attributes. This improvement lies in those features of the apparatus operative to prevent an undesired change in the power transmission ratio of the motor vehicle when the engine throttle is either suddenly opened or suddenly completely closed; and in a preferred embodiment of my invention, this improvement lies in the provision of a simple and compact multi-chambered so-called brain unit, that is that part of the apparatus for determining the transmission ratio change to be made, and means for controlling the flow of air to and from said unit to control the gaseous pressure within said chambers of said unit.

Other objects and advantages of the invention will be apparent from the following description when taken in conjunction with the accompanying sheets of drawings, wherein:

Figure 1 is a perspective view, more or less diagrammatic, illustrating the general arrangement of the apparatus of my invention when applied to a motor vehicle;

Figure 2 is a partial sectional view taken as indicated by line 2—2 of Figure 1 and showing the unit which determines the change needed in the transmission ratio;

Figure 5 is a longitudinal sectional view taken through the clutch-actuating fluid motor and its control valve;

Figure 7 is a side elevation of a part of the same shifter actuating mechanism;

Figure 8 is a plan view showing apparatus associated with the shifter lever for actuating one of the electric control switches; and Figure 9 is an enlarged sectional view of the restricting valve disclosed in Figure 3, said valve being incorporated in the air transmitting means interconnecting the intake passage and one of the compartments of the brain unit.

Figure 3:
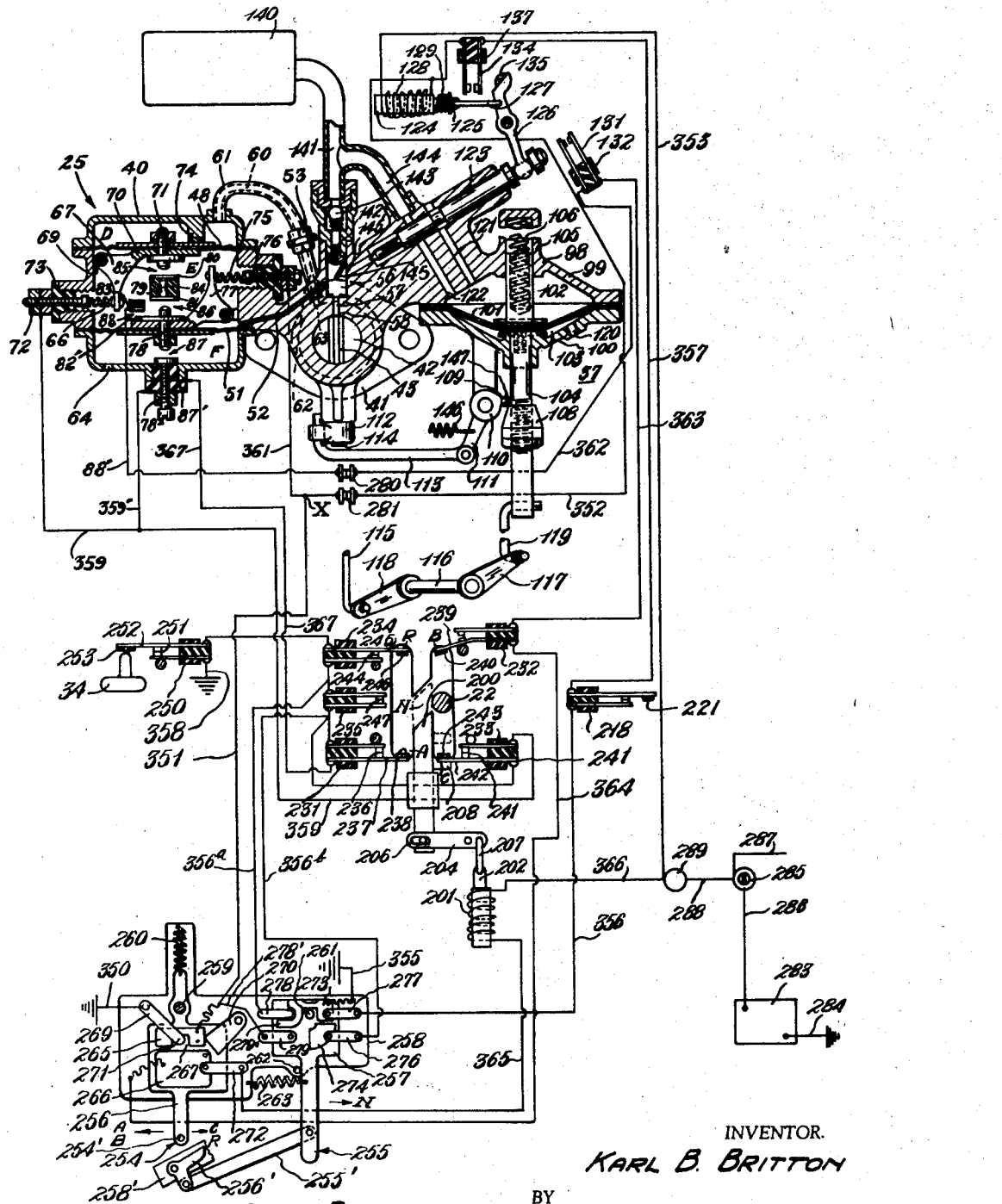
Figure 3 is a plan view, partly in section and more or less diagrammatic, showing the change determining unit and throttle operating mechanism together with various electrical control circuits.

The apparatus of my invention is especially applicable to motor vehicles driven by internal combustion engines through variable transmissions and, in its preferred embodiment, operates to automatically determine when a change should be made in the power transmission ratio and the nature of the change, and automatically effects the change which has been determined to be needed. The principle of my invention may, of course, be embodied in various structural arrangements, some of which have been illustrated in the accompanying drawings.

Before proceeding with the detailed description of my control apparatus, it might be advantageously explained that, in general, my invention provides means for automatically determining the nature and time of changes needed in the power transmission ratio in accordance with existing speed and load conditions and also provides means for automatically putting into effect the transmission ratio changes which have been determined to be needed. The means for determining the transmission ratio changes may be conveniently referred to as the "brain unit." The means for automatically effecting the ratio changes embodies a plurality of associated mechanisms, comprising a clutch actuating unit or mechanism, and a unit or mechanism for actuating the shifter lever of the transmission device and which may be conveniently referred to as the shifter actuating unit. The means for automatically effecting the ratio changes also includes a unit or mechanism for automatically controlling the fuel supply for the engine, and which may be conveniently referred to as the shift throttle unit.

Without entering into a detailed description of the various units and their operation, it might be beneficial to explain at this point that when changes occur in the load against which the vehicle engine is working and in the engine speed, these changes affect the brain unit and enable the latter to determine when a shift or change should be made in the transmission ratio, and whether the shift should be "up" (from a high gear ratio to a lower gear ratio) or whether the shift should be a "down" shift (from a low gear ratio to a higher gear ratio). In addition to the function of determining when a shift should be made, and whether the shift should be up or down, the brain unit also performs three distinct control functions. One of these latter functions consists in controlling the clutch actuating mechanism or unit, another consists in controlling the shifter actuating mechanism or unit, and the third consists in controlling the shift throttle unit or mechanism.

It is also to be explained at this point that this specification and the accompanying drawings are directed to the apparatus disclosed in my Patent No. 2,187,824 improved by substituting, for the brain unit disclosed in the apparatus of said patent, a different and improved brain unit together with air transmitting means, including valvular means, interconnecting said unit with the intake passage of the internal combustion engine. As will be explained in detail hereinafter and as set forth in the objects of my invention, this improved brain unit and its connections with the intake passage improve the operation of the apparatus disclosed in my aforementioned patent by preventing an undesired up-shift operation of the transmission when the engine throttle is suddenly completely closed.

My ratio changing apparatus, or change speed apparatus as it may sometimes be designated, may be applied to all of the various kinds of motor vehicles of the internal combustion type, and may be applied to such vehicles as accessory equipment or may be incorporated in the vehicles during the building thereof. In Figure 1 of the drawings I have shown my ratio changing apparatus applied to a motor vehicle 15 of conventional type. The vehicle is here shown as having an internal combustion engine 16 operably connected with a propeller shaft 17 through a clutch device 18 and a transmission device 19. The vehicle is shown as being provided with a driving compartment 20 and as having an instrument board 21 in the driving compartment.

The transmission device 19 may be any well known type of transmission, such as a gear transmission, a hydraulic transmission or an electric transmission. The transmission device may have the usual manually operable shift lever or a corresponding control 22 extending therefrom into the driving compartment 20. The shift lever 22 constitutes a part of the usual shifting mechanism of the sliding-gear type transmission device 19 illustrated in this instance, whereby the setting of the transmission may be changed or shifted from one power transmission ratio to another, or to "reverse" or "neutral." The transmission device 19 may be one having five different settings or positions, comprising one reverse ratio, three different forward ratios, and a neutral position. As shown in Figure 1, the shift lever 22 is in the position corresponding with the highest available forward ratio and this low speed position may be conveniently referred to as "first speed" or position A. The shift lever 22 may be moved to any of the other settings or ratios affording an intermediate speed, a high speed, reverse or neutral, and the other positions to which the shift lever may be moved to correspond with these settings are designated in Figure 1 as positions B, C, R and N.

The brain unit, represented generally by the reference character 25, may be located at any one of the various suitable points adjacent the internal combustion engine 16, for example, in the case of an internal combustion engine of the Otto type, it may be associated with the intake manifold 26 and carburetor 27. The brain unit may be variously arranged with respect to the intake manifold and carburetor and, in fact, any relative positioning may be provided which will cause the brain unit to be affected in the desired manner in accordance with variations occurring in engine speed and load. One arrangement which I have found to be quite satisfactory is with the brain unit 25 disposed between the carburetor 27 and the intake manifold 26. In the present arrangement I have shown the carburetor 27 as being a down-draft carburetor, but it will be understood, of course, that the invention is not dependent upon any particular type of carburetor being used.

The clutch actuating unit is designated generally by the reference character 30, and comprises a power device, preferably a fluid motor 31 operably connected with the usual clutch shaft 32, and a valve 33 for controlling the fluid motor. The fluid motor 31 and its control valve 33 may be located in the engine compartment or at any other point where connection to the clutch shaft 32 may be conveniently made. The usual clutch pedal 34 may also be provided on the shaft 32 and arranged so that the shaft may be actuated either automatically by the unit 30 or manually by the pedal. The clutch itself may be any one of various available devices suitable for disconnecting an engine from the transmission. In some instances the clutch may be an automatic clutch, for example, a centrifugally operated clutch.

The shifter actuating unit, designated generally by the reference character 35, may be located adjacent the transmission device 19 and the shifter 22 projecting therefrom. The shifter actuating unit may be located either above or below the floor of the driving compartment 20, and in Figure 1 of the drawings is shown as being located just rearwardly of the shift lever 22 to which the unit is operably connected.

The shift throttle unit 37 may be located at any one of various suitable points; for example, it may be arranged close to the brain unit 25 and the carburetor 27, and, if desired, the usual carburetor throttle may be used as the shift throttle. The unit 37 may embody a separate throttle, and, as shown in Figure 2, may be located in the fuel intake.

The brain unit 25 will now be described more in detail, and from the structure illustrated in Figures 2 and 3 of the drawings, it will be observed that this unit is provided with a multi-sectioned diaphragm casing 40 and an intake fitting or conduit member 41. The central section of the casing 40 and the conduit member 41 may be constructed as a single metal casting or the like, so that the diaphragm casing will be supported from the member 41 when the latter is bolted or otherwise connected to the intake of the engine. The fitting 41 may be constructed in the form of a flanged spacer unit or insert which may be disposed between, and have bolted connection with, the intake manifold 26 and the carburetor 27. The fitting 41 has a passage 42 therethrough which constitutes a part of the intake conduit when the fitting is arranged between the carburetor and intake manifold as just explained. When a separate shift throttle is employed, as mentioned above, it may be in the form of a butterfly valve 43 disposed in the passage 42 to constitute a part of the shift throttle unit to be described hereinafter.

The multi-sectioned diaphragm casing 40 is separated into three compartments D, E and F by two movable mediums, preferably two flexible diaphragms 48 and 51 secured at their peripheries, as disclosed in Figure 3, between sections of said casing. As disclosed in Figure 3, the compartment E is connected with the intake passage 42 by means of a relatively small diameter passage 52 extending through the central section of the casing 40 and the body of the conduit member 41, a pocket or chamber 56 formed in the conduit member 41 and a relatively small diametered passage 57 in said conduit. As disclosed in Figure 2, the inner end of the passage 57 constitutes a port 58, said port being preferably positioned below the butterfly valve 43 in the throat portion of a Venturi tube constituting a part of the conduit 41. Since the passage 52, chamber 56 and passage 57 are always open, it will be seen that the compartment E always communicates with the intake conduit 42 through the port 58. As will be brought out in the description to follow, by making the passage 57 of a relatively small diameter and by the provision of the hereinafter described air flow restricting means in the connection between the chamber D and the intake passage 42 there is provided a means for effecting the desired operation of the brain unit.

The compartment D in the upper end of the diaphragm casing 40 is air-tight except for a passage 60 leading therefrom through a conduit 61, said conduit at one end preferably extending within a recess in the body of the conduit 41; and a relatively short duct 62 in the conduit 41 ending in a port 63, Figure 2, serves to interconnect the intake passage 42 with the passage 60. The compartment F of the diaphragm casing 40 communicates with the atmosphere through a vent port 64 in one of the end sections of said casing.

Describing now an important feature of my invention, there is included in the conduit 61 a restricting valve 53. This valve, which is disclosed in Figure 3 and is also disclosed in detail in Figure 9, includes a two-part hollow body member 54 having an end portion 54' screw-threaded into a portion of the conduit 61 and having its other end screw-threaded into another portion of the conduit 61. The end portion 54' is bored to provide a passage 52'. The valve member 54 is preferably provided with a circular flange 44 having relatively large openings 45 therein; and a disc 46 having a relatively small opening 50 therein, is adapted to seat either upon the periphery of the flange 44 or upon a seat 44' at the inner end of the valve portion 54'. A relatively light spring 50' is preferably interposed between the disc 46 and the seat 44' and serves to bias said disc into engagement with its seat on the flange 44. When the gaseous pressures in the upper and lower sections of the conduit 61 differ sufficiently to create a certain differential of pressures acting on the disc 46, said disc then moves to its seat 44' and in doing so compresses the spring 50'; however, the weight of said spring and the remaining parts are preferably so constructed and arranged that the disc 46 is seated when this differential of pressures factor is very small.

Provision may be made for adjusting or calibrating the resistance which the diaphragms 48 and 51 offer to flexing. The adjustment for the diaphragm 48 may comprise a compression spring 66 which has one end thereof connected to one arm of a two-armed lever member 67 which is pivotally mounted upon a boss 69 secured to the casing 40. An arm 70 of the lever member 67 is secured to an electrical contact member 71 which is detachably secured to the central portion of the diaphragm 48. One end of the spring 66 is secured to the headed end of an electrical conductor member 72 threadedly mounted in a nut 73 of insulating material. The resistance to movement of the diaphragm 48 may therefore be calibrated by adjusting the conductor 72 thereby varying the compression of the spring 66. A stop 74 secured to the inner side of the upper section of the casing 40 serves to limit the outward movement of the diaphragm 48 under the action of the spring 66.

The means for adjusting the resistance to movement of the diaphragm 51 is of the same construction as the above described adjusting means and includes a compression spring 75 interposed between and secured to an adjustably mounted electrical conductor member 76 and to one arm of a two-armed lever member 77, the remaining arm of said member being secured to an electrical contact member 78 preferably detachably secured to the central portion of the diaphragm 51. The resistance to movement of the diaphragm 51 may be calibrated by adjusting the conductor 76 thereby varying the compression of the spring 75.

The diaphragm 48 is adapted to be moved or flexed as the result of a pressure differential between the compartments E and D and may be conveniently referred to as a velocity diaphragm because the pressure differential between the compartments E and D is a function of the velocity of the fuel mixture flowing through the intake passage 42 while the shift throttle 43 is open. The diaphragm 51 is adapted to be moved or flexed as the result of a pressure differential between the compartment E and the compartment F. This diaphragm may be conveniently referred to as the vacuum diaphragm because the compartment E always communicates with the intake passage 42 and the compartment F always communicates with atmosphere, and hence the pressure differential acting on this diaphragm is always a function of the vacuum or subatmospheric pressure existing in the intake conduit.

In order that the pressure differential existing between the compartments E and D may be a function of the velocity of the intake fluid, as explained above, I construct the passage 42 of the intake member 41 in the form of a Venturi tube, as shown in Figure 2 of the drawings. A restriction 82 in the intake passage 42 forms the throat 83 of the Venturi tube, and it will be noted that the port 58 communicates with the intake passage 42 substantially at the throat of the Venturi tube. The port 63 communicates with the Venturi tube at a point spaced from the restricted throat 83 as shown in Figure 2. Thus the pressure existing in the compartment E will be transmitted from the throat of the Venturi tube through the port 58 and the pressure existing in the compartment D will be the pressure transmitted from the large part of the Venturi tube through the port 63. From the arrangement just described it will therefore be seen that the diaphragm 48 responds to changes in the velocity of the mixture flowing in the intake passage 42 and the diaphragm 51 responds to changes in the vacuum or subatmospheric pressure occurring in this passage.

Movements of the diaphragm 48 are utilized to actuate an electric switch 85 comprising the aforementioned movable contact member 71 and a fixed contact member 79 fixedly secured to the casing 40, said latter member comprising metal plates 80 and 81 and a metal pin 84; and movements of the diaphragm 51 are utilized to actuate electric switches 86, 87 and 88.

The switch 86 comprises the aforementioned movable contact member 78 and the plate 81 of the fixed contact member 79; the switch 87 comprises the contact member 78 and a fixed contact member 78′ threadedly and therefore adjustably mounted in a nut 87′ of insulating material threadedly mounted in one section of the casing 40; and the switch 88 comprises a fixed contact member 83′ fixedly secured to the casing 40 and a portion 82′ of the movable contact member 78. A lead 88′ interconnects the fixed contact member 83′ and a switch 280. The adjustment of the contact member 78′ provides for a calibration of the switch 87 with respect to the switches 86 and 88. There is thus provided an adjustment for the hereinafter described down-shift operation of the brain unit and this is needed because when the compression of the spring 75 is changed to vary the speed at which a full throttle up-shift takes place, it also effects the position at which a down-shift takes place.

At this juncture it is to be noted, as disclosed in Figure 3, that the heretofore described fixed and movable contact members of the brain unit together with the lever members 66 and 77 and conductor members 72 and 76 of said unit are all insulated from the means supporting said members.

Describing in greater detail the operation of the switches 86, 87 and 88, the same are operated by movement of the diaphragm 51, switches 86 and 88 being closed by an upward movement of said diaphragm caused by an increase in vacuum, that is decrease in absolute pressure, in the intake passage 42 and switch 87 being closed by a downward movement of said diaphragm resulting from an expansion of the spring 75. The switch 85 is normally open, but is closed upon movement of the diaphragm 48 in response to an increase in the velocity of the fuel mixture flowing in the intake passage 42. The switch 86 is open and the switch 87 is closed when the engine is dead; however, when the engine is idling, thereby creating a relatively high vacuum in the chamber E, the switch 86 is closed and the switch 87 is open.

As will be brought out in the description to follow, both switches 85 and 86 must be closed to effect an up-shift operation of the gearshift control mechanism constituting my invention and this occurs only when the rate of fluid flow in the intake passage is sufficient not only to create a certain critical vacuum in the chamber E sufficient to result in a closing of the switch 86, but also to create a certain differential of vacuums in the chambers D and E resulting in a closing of the switch 85. This difference of vacuums in the chambers D and E is a function of the rate of flow, that is velocity of fuel mixture passing through the intake passage 42, the greater the velocity the greater the differential. To effect a down-shift operation of the mechanism of my invention, the switch 87 must be closed and this operation is effected by the spring 75 when the degree of vacuum in the chamber E is decreased to a certain critical factor.

At this juncture attention is directed to an important feature of my invention, that is the operation or rather cooperation of the restricting valve 53 and the restricted connection between the compartment E and the intake passage 42 in the control of the operation of the brain unit. The relatively small diametered passage 57 in the air transmitting connection between the compartment E and the intake passage 42 serves to damp out the effect of the fluctuations of the rate of fuel mixture flow occurring in the intake passage 42 when said rate is quickly changed and prevents said fluctuations from affecting the gaseous pressure, that is degree of vacuum, in the chambers D and E. If, for example, the throttle is suddenly opened, even partly, there immediately results a substantial drop in the rate of flow of fuel mixture through said intake passage 42 and if the resulting rate of flow of said mixture into the chamber E were not kept relatively low, then the vacuum in said chamber would suddenly decrease and this would result, if said decrease is of a certain magnitude, in a downward movement of the diaphragm 51; for the increase in gaseous pressure, that is decrease of vacuum, within the compartment E, would lower the differential of pressures acting upon the diaphragm 51 and this would result in the downward movement of said diaphragm under the action of the spring 75. The switch 87 would therefore be closed and this would result, as will be explained in greater detail hereinafter, in a down-shift operation of the mechanism. This operation of course is undesirable.

The prime purpose therefore of making the passage 57 of relatively small diameter is to prevent an undesired down-shift operation of the transmission when there occurs a momentary drop in fuel mixture flow in the intake passage resulting from a sudden opening of the throttle.

Describing now the operation of the restricting valve 53, this valve cooperates with the passage 57 in preventing an undesired up-shift operation of the brain unit when the throttle is suddenly opened, this up-shift operation being effected when the diaphragms 48 and 51 are both positioned to close the switches 85 and 86 respectively. As to the operation of the valve 53 and passage 57 to prevent this undesired up-shift operation of the brain unit, it will be assumed, for example, that the automobile is running in second gear on level ground at a constant or substantially constant low speed. The vacuum in both chambers D and E is then very high, the vacuum in chamber E always being higher than the vacuum in chamber D when the engine is running; but the difference of these vacuums is very low. As a result, the pressure differential operated diaphragm 51, by virtue of the setting of the spring 75, is drawn inwardly to close the switch 86; however, the pressure differential operated diaphragm 48, by virtue of the setting of the spring 66, is not drawn inwardly to close the switch 85 inasmuch as the difference in vacuums in the chambers D and E is not great enough to effect this result. If now the throttle is suddenly opened, the vacuum in chamber E will decrease and the difference in vacuums in chambers D and E, and the resultant differentials of pressure acting on the diaphragm 48, will increase. At this point it is to be noted that in describing this particular operation of the brain unit, it will be assumed of course that this decrease in vacuum in the chamber E is insufficient to effect the aforementioned down-shift operation of the brain unit by a closing of the switch 87.

Now if the diameter of the passage 52' were too large relative to the diameter of the aforementioned passage 57, fuel mixture would, with this sudden opening of the throttle, flow into chamber D at a greater rate than fuel mixture would flow into the chamber E. This of course would be undesirable inasmuch as there would result an undesired up-shift operation of the brain unit; for the differential of pressures to which the diaphragm 48 would then be subjected would be great enough to overcome the spring 66 and this would result in an inward movement of the diaphragm to close the switch 85.

It follows therefore that by including the restricting valve 53 in the conduit 61 there is provided means cooperating with the passage 57, to delay the closing of the switch 85 until after the switch 86 is opened, thereby preventing an undesired up-shift operation of the brain unit when the throttle is suddenly opened; for the relatively small opening 50 in the then seated valve member 46 serves to cut down the rate of flow of fuel mixture into the chamber D and by making this opening of a certain diameter relative to the diameter of the passage 57, the rates of flow of fuel mixture into the chambers D and E are so controlled as to prevent an increase in the differentials of pressures acting on the diaphragm 48 sufficient to close the switch 85 before the switch 86 is opened.

The cooperating valve 53 and passage 57 therefore serve to prevent an undesired down-shift operation of the brain unit when the throttle is suddenly opened and also serve to prevent an undesired up-shift operation of said unit when the throttle is so operated.

As to the operation of the valve 53, it is also to be noted that the diameter of the passage 52' in said valve must not be made too small; for to do so would result in an undesired up-shift operation of the brain unit whenever the throttle is suddenly completely closed. It is accordingly a feature of my invention to make the passage 52' large enough to insure a very rapid egress of air from the chamber D when the throttle is suddenly completely closed; and this results, together with a concurrent increase in vacuum in the chamber E, to insure a differential of pressures acting on the diaphragm 48 sufficient to permit the spring 66 to maintain the switch 85 open and thereby prevent an undesirable up-shift operation of the brain unit.

There is thus provided, by the brain unit 25 and the air transmitting connections including the restricting passage 57 and the restricting valve 53 with its restricting passage 52' and valve member 46, means constituting an improvement over the brain unit and air transmitting connections of my Patent No. 2,187,824; for with my improved brain unit and air transmitting connections, the driver may, either inadvertently or by design, either suddenly open the throttle or suddenly completely close the throttle without effecting an undesired operation of the brain unit. It is to be stressed, however, that the principal purpose of including the restricting passage 57 and the valve 53 in the connections between the intake passage 42 and the brain unit 25 is to prevent an undesired operation of said unit when the throttle is suddenly opened or closed; for with all normal operations of the throttle, to vary the degree of its opening when controlling the speed of the vehicle, the passage 47 and valve 53 do not come into play to prevent this undesired operation of the unit 25, the operation of the brain unit being then solely a function of the rate of flow of the fuel mixture for a given setting of the springs 66 and 75.

As to such normal operation of the throttle by properly sizing the passages 57 and 52' together with a proper adjustment of the springs 66 and 75 there results a brain unit operative, at a critical fuel mixture flow in the intake passage, to initiate an up-shift operation of the transmission operating mechanism and also operative, at a critical gaseous pressure in the chamber E to initiate a down-shift operation of the transmission operating mechanism; for with my invention at a certain differential of gaseous pressures in the chambers D and E, the switch 86 being then closed, there automatically results a closing of the switch 85 with a resultant up-shift operation of the brain unit. Also, at a certain differential of gaseous pressures in the chambers E and F there automatically results a closing of the switch 87 with a resultant down-shift operation of the brain unit. It is to be particularly noted at this point that the engine speed and therefore engine torque is relatively high when the rate of flow of fuel mixture in the intake passage is relatively high; and said engine speed is of course relatively low when the rate of flow of fuel mixture is relatively low. It is apparent therefore that the above set forth objects of my invention are accomplished by the mechanism described herein.

It is also to be noted that the desired up-shift operation of the brain unit is effected despite the driver's action in partially closing the throttle due to his desiring less speed of the vehicle or the same speed on a lesser grade. The driver may, if the rate of flow of fuel mixture in the intake passage is high enough, even completely close the throttle in a normal manner and still there will result the desired up-shift operation of the transmission. As to the down-shift operation of the brain unit, this operation, as described above, is effected only when the gaseous pressure in the chamber E drops to or below a certain factor and in the operation of the mechanism of my invention, this necessary down-shift operation occurs when the engine speed, or in other words engine torque, drops as a result of overloading of the engine.

Since the throttle unit 37 is closely associated with the brain unit, so far as position and function are concerned, I will next proceed to describe the detailed construction of this unit. The shift throttle unit is provided with a power device 98 for actuating the shift throttle 43 and the valve 33 of the clutch actuating unit 30. The power device 98, as shown in this instance, may be a fluid pressure motor. This power device is provided with a casing 99 which may be supported from the intake fitting 41 by having a portion of the casing formed integral with the intake fitting as shown in Figure 3 of the drawings. The casing 99 includes a cover 100 and is provided with a movable diaphragm 101 which divides the chamber of the casing into compartments 102 and 103.

A reciprocable rod 104 is slidable in an opening of the cover 100 and is connected with the diaphragm 101 so as to be actuated thereby. An extension 105 of the casing 99 contains a spring 106 which acts on the diaphragm to normally urge the same toward the cover 100. The rod 104 carries a cam 108 which, upon movement of the rod, engages an arm 109 of a bell crank lever 110. The other arm 111 of the bell crank lever is connected with a lever 112 by means of a link 113. The lever 112 is pinned or otherwise secured to the shaft 114 of the shift throttle 43. The rod 104 is also connected with the actuating member 115 of the valve 33, such connection being made through suitable linkage, including the rock shaft 116 having levers 117 and 118 mounted thereon and a link 119 connecting the rod 104 with the lever 117.

The cover 100 of the casing 99 is provided with an opening 120 which connects the compartment 103 with atmosphere. The compartment 102 on the opposite side of the diaphragm 101 may be connected either with atmosphere or with the intake passage 42. For this purpose I provide passages 121 and 122 which communicate with the compartment 102 and are controlled by a movable valve 123. When the valve 123 is in the position shown in Figure 3 of the drawings the passage 121 connects the compartment 102 with the atmosphere and the passage 122 is closed. When the valve 123 is moved outwardly the passage 121 is closed and the passage 122 is connected with the pocket 56 which, in turn, is connected with the intake passage 42 through the passage 57 and the port 58.

The valve 123 may be actuated in various ways, for example by a solenoid 124 having the plunger 125 thereof operably connected with the valve by means of the pivoted lever 126 and the link 127. The plunger of the solenoid is normally retracted from the coil 128 by means of a spring 129, but when the winding is energized the plunger is drawn inwardly and the valve 123 is shifted to its outer position.

An electric switch 131, which will later be referred to as a synchronizing switch, is disposed adjacent the valve 123, so that when the latter is moved outwardly the contacts of the switch will be closed. The switch contacts are normally open but are closed upon outward movement of the valve 123. The switch 131 may be suitably supported adjacent the valve 123 by a mount 132 formed of insulating material.

Another electric switch 134, which will later be referred to as a holding circuit switch, is arranged adjacent the lever 126 so as to be actuated by movement of this lever. The contacts of the switch 134 are normally open, but when the lever 126 is rotated to move the valve 123 to its outer position, the switch 134 is engaged and closed by an element 135. This element is mounted on the lever 126 and is formed of insulating material. The switch 134 may be suitably supported adjacent the lever 126 by a mount 137 formed of insulating material.

If desired, the shift throttle unit may include a vacuum storage tank 140 having a conduit 141 connected with the pocket 56 through a restriction 142 and controlled by a check valve 143. The check valve is arranged to permit fluid to be withdrawn from the tank 140 but to prevent a return flow thereinto. A branch conduit 144 connects the tank 140 with the passage 122 so that when the valve 123 is moved to its outer position the tank 140 will be in communication with the compartment 102. A second check valve 145 is arranged to close the port 145' of the pocket 56 in the event that the vacuum of the tank 140 is stronger than the vacuum of the manifold at the time that the valve 123 is moved to its outer position.

A tension spring 146 may be connected with the arm 111 of the bell crank 110 so as to normally hold the shift throttle 43 in the open position shown in Figure 2 and to also normally hold the bell crank 110 in position for the roller 147 of the arm 109 to be engaged by the cam 108.

Figures 4, 6:
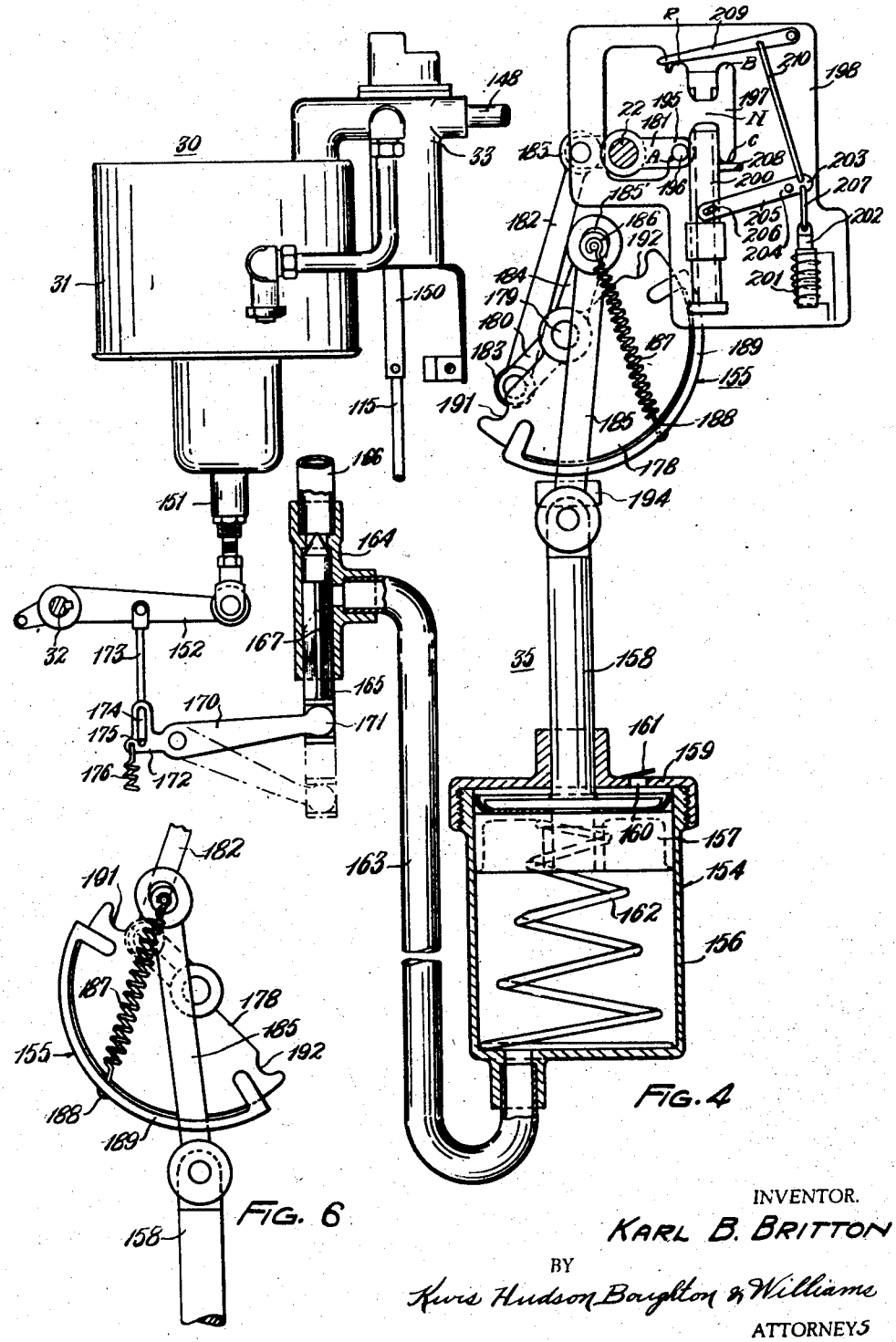
Figure 4 is a plan view, partly in section and more or less diagrammatic, showing the mechanisms for operating the shifter lever and the clutch.
Figure 6 is a detached partial plan view illustrating another position of a snap action device embodied in the shifter actuating mechanism.

The clutch actuating unit 30, which is best shown in Figures 4 and 5 will next be described in detail. As mentioned above, this unit includes a power device in the form of a fluid motor. This fluid motor may be of a construction known in the art and may comprise a cylinder 31 having a piston 31a therein and chambers 31b and 31c on opposite sides of the piston. One of the chambers, namely, the chamber 31c, communicates with atmosphere through a passage 31d controlled by an inwardly opening check valve 31e and the other chamber is connected with the intake manifold through the valve 33 and the conduit 148. The conduit 148 communicates with the intake manifold through the port 149 (see Figure 2) and is controlled by the movable element 150 of the valve 33.

The casing of the valve 33 has a passage or port 33a which connects with chamber 31b of the cylinder 31 and also has ports 33b and 33c which connect, respectively, with atmosphere and with suction conduit 148. The valve element 150 has grooves 33d and 33e therein the first of which serves to connect the chamber 31b with the suction conduit 148 when the valve element is shifted to its outer position and the other of which serves to connect the chamber 31b with atmosphere when the valve element is moved to its inner position as shown in Figure 5.

The piston 31a has a piston rod 151 which projects from the cylinder and is connected with the clutch actuating lever 152. A compression spring 31f is adapted to be stressed when the piston 31a is moved inwardly and serves to subsequently return the piston to the position shown in Figure 5. During inward movement of the piston, air enters the chamber 31c freely past check valve 31e and also through a tapered groove 31g in the piston rod. On the return or outward movement of the piston 31a air escapes from chamber 31c through the groove 31g but at a progressively decreasing rate so as to prevent "slamming" of the piston.

When the valve element 150 is moved to its outer position the chamber 31b is connected with suction conduit 148 and the piston 31a is shifted inwardly causing the lever 152 to operate the clutch shaft 32 in a direction to disengage or release the clutch. When the valve element 150 is moved to its inner position the chamber 31b is vented to atmosphere thus permitting the spring 31f to return the piston 31a and cause actuation of the lever 152 and the shaft 32 in a direction to reengage the clutch. It will be understood, of course, that disengagement of the clutch by actuation of the lever 152 and the shaft 32 disconnects the engine 16 from the transmission device 19 to permit shifting of the transmission from one ratio to another, and that reengagement of the clutch restores the driving connection between the engine and the transmission after the desired shift has been made.

The shifter actuating unit 35 will next be described in detail. This shifter actuating unit may include a power device 154 which is operably connected with the shifter lever 22 through a snap action device 155. The snap action device, as will be explained presently, permits the use of a single acting reciprocating power device for moving the shifter lever 22 to its forward and rearward position. It should also be mentioned that the snap action device 155 is in itself a novel device which is adapted to be applied to a variety of different uses.

The power device 154 of the shifter actuating unit, as best shown in Figure 4 of the drawings, comprises a cylinder 156, having a piston 157 operable therein and connected with a piston rod 158 which projects from the cylinder and is slidable in an opening of the cylinder cover 159. A vent passage 160 in the cylinder cover provides a connection for one end of the cylinder to the atmosphere. A control for the vent 160 may be provided, for example, in the form of a "leaky" check valve 161 which causes the inward or rearward movement of the piston to take place slowly and the forward movement to take place quickly. For this control I may use a flap formed of fabric or the like. A spring 162 is disposed in the cylinder on the opposite side of the piston and normally biases or urges the piston in a forward direction, that is, towards the cylinder cover 159. A conduit 163 connects with the cylinder 156 at the side of the piston opposite the vent passage 160. The other end of this conduit communicates with a valve casing 164 in which a movable valve element 165 is arranged to control the transfer of pressure fluid through the conduit. Another conduit 166 connects the valve casing 164 with the conduit 148 which, in turn, is connected with the intake manifold through the port 149 as explained above.

The valve element 165 is arranged in the casing 164, such that when it is in the position shown in full lines in Figure 4, the conduit 166 is closed and the conduit 163 is open to atmosphere through the fluted passages 167 formed in the stem of the valve element. When the valve element is moved outwardly of the casing 164 to the dotted line position indicated, the conduit 163 is no longer open to atmosphere but is connected to the conduit 166 to cause a subatmospheric condition to be created in the cylinder 156. When this occurs air pressure entering the cylinder through the opening 160 acts on the piston and causes a power stroke thereof.

The valve element 165 may be actuated by a pivoted lever 170, which has the arm 171 thereof operably connected with the valve element and an arm 172 connected with the clutch lever 152 by means of the link 173. The arm 172 is preferably formed with a slot 174 in which the end 175 of the link 173 engages. The slot and link end provide a lost motion connection such that the valve element 165 will be actuated after a predetermined movement of the clutch lever 152 occurs. A tension spring 176 may be arranged to act on the pivoted lever 170 to normally hold the valve element 167 in its closed position. It will thus be seen that with this lost motion connection and the arrangement provided, the valve 165 will be opened to cause a power stroke of the piston 157 for making the shift only after the clutch has been disengaged by a power stroke of the piston of the device 31.

As mentioned above, the piston rod 158 of the power device 154 is connected with the shifter lever 22 through a snap action device 155. This snap action device is arranged just rearwardly of the shifter lever 22 and may include a semicircular plate 178 which is pinned to the shaft 179, and a lever 180 which is also pinned to the shaft 179. A connecting member 181, which may be clamped or otherwise secured to the shifter lever 22, is operably connected with the lever 180 by a link 182. The ends of the link 182 are connected, respectively, with the lever 180 and the connecting member 181 by ball connections 183 which permit a desired extent of pivotal movement between the connected parts. A link 184 is disposed just above the plate 178 and has one end thereof pivoted on the shaft 179 so as to permit swinging of the link relative to the plate. The other end of this link is connected with the outer end of the piston rod 158 by a relatively longer link 185. The connections between the ends of the link 185 and the piston rod 158 and the link 184, are pivotal connections adapted for swinging movement, as shown in Figures 4 and 6. Since the links 184 and 185 are of different lengths and swing about different centers, the pivotal connection therebetween should allow for relative shifting as by providing the link 185 with an oblong or elliptical opening 185' into which the upper end of a pin 186, carried by the link 184, extends. A tension spring 187 has one end thereof connected with the pivot pin 186 and the other end thereof connected with the plate 178 at a point 188 which is substantially opposite the axis of the shaft 179 and at or adjacent the mid-point of the arc defining the curved edge of the plate. The connection between the spring and the plate 178 may be conveniently made by means of a curved rail-like member 189 which has the ends thereof connected to the plate and the intermediate portion thereof spaced above the arcuate edge of the plate to provide a slot 190 to accommodate the link 185. The spring 187 is connected to the pivot pin 186 and to the intermediate portion of the rail member 189 so as to lie above the plane of the link 185, as shown in Figure 7.

The plate 178 is provided with abutment notches 191 and 192 at opposite sides of the shaft 179 and at a distance from the axis of the shaft corresponding substantially with the spacing of the pivot pin 186 from the shaft by the lever 184. The abutment notches alternately receive the downwardly projecting part 193 of the pivot pin 186 so that the plate may be rotatably driven in one direction or the other by pulling force transmitted through the link 185.

In the construction and arrangement of the snap action device shown in Figure 4, the link 182 extends at an angle of approximately 30° to the longitudinal axis of the vehicle when the shifter lever 22 is in neutral position. With this link 182 disposed at this angle I find that the shifter lever can be caused to move into any one of the four various transmission settings, or into its neutral position, by simple pushing or pulling forces transmitted through the link. Assuming, for example, that the parts are in the positions shown in Figure 4, a power stroke of the piston 157 would now cause the pivot pin 186 to be swung in a clockwise direction and to engage in the abutment notch 192. Following such engagement the plate 178 would be rotated in a clockwise direction and the lever 180 would be rotated in the same direction to cause a pushing force to be transmitted to the shifter lever 22 through the link 182. During the clockwise rotation of the plate 178, the anchored end 188 of the spring 187 is also shifted in a clockwise direction, thereby moving this anchored end to a new setting or position at the opposite side of the link 185.

Following its power stroke the piston is moved outwardly under the action of the spring 162 and this movement may be limited as by a suitable stop 194 arranged to be engaged by the outer end of the piston rod 158. While the piston is being returned by the spring 162 the link 185 causes the link or arm 184 to swing on the shaft 179 to thereby shift the spring anchor 186 across the line of dead center and thus tension the spring 187. The tension of the spring 187 thereupon causes the pivot pin 186 to be swung in a counterclockwise direction, which results in the links 184 and 185 assuming a position relative to the plate 178 similar to that shown in Figure 6 of the drawings. With the parts in this position it will be seen that upon the next power stroke of the piston 157 the pivot pin 186 will engage in the abutment notch 191 and will rotate the plate 178 in a counterclockwise direction. This movement of the plate will also swing the lever 180 in a counterclockwise direction and cause a pulling action to be exerted on the shifter lever 22 through the link 182, and will also move the anchor point 188 to the position shown in Figure 4.

The connecting member 181, which is attached to the shifter lever 22, may be constructed with an extension part or arm 195 which carries a pin 196. During the shifting of the lever 22 to positions corresponding with the different transmission settings A, B, C and R, the pin 196 moves to corresponding positions of an H-like opening 197 of the deck or plate 198 through which the shifter lever extends. When the pin 196 is in reverse position D, or in the second speed position B, it will be observed that a pulling action is required to be transmitted through the link 182 to move the pin to the high speed position C or to the first speed position A. Similarly, when the pin is in first speed position A, or in high speed position C, a pushing force transmitted through the link 182 is required to shift the pin to either the reverse position R or the second speed position B.

To prevent the pin 196 from passing through the neutral space N when it is not desired to have it do so, such as when the pin is intended to be moved from the second speed position B to the high speed position C, I provide a movable member 200 which, because of its ability to close the passage through the neutral space N, may be conveniently termed a "gate." The gate 200 may be mounted on the deck 198 for reciprocating movement to control the neutral space N and may be projected into the neutral space by means of a solenoid 201. The solenoid has a plunger 202 which is connected with an arm 203 of a pivoted lever 204. The opposite arm 205 of the lever is pivotally connected to the gate 200 by a pin and slot connection 206. Energization of the solenoid shifts the plunger 202 into the coil and the pull thereby exerted on the lever 204 through the link 207 projects the gate 200 into the neutral space N.

Provision is made for retracting the gate 200 so as to leave the neutral space N unobstructed and this retracting means may consist of a lug 208 projecting from the gate, and a lever 209 pivoted on the deck 198. The lug 208 projects laterally toward the high speed position C and is adapted to be engaged by the pin 196 when the latter moves rearwardly into the high speed position. The lever 209 is arranged with the free end thereof extending adjacent the reverse position R, so that it will be engaged and shifted by the pin 196 upon movement of the latter into the reverse position. Such shifting of the lever 209 acts through a link 210 connecting the same with the lever arm 203 and causes retraction of the gate 200. The actuation of the gate in timed relation to the various other devices will be explained hereinafter as a part of the general description of operation.

Reverting now to Figure 1 of the drawings, it will be observed that in addition to the deck 198 supporting the gate actuating mechanism, I may provide one or more other decks 212 and 213 spaced thereabove. The deck 212 may be utilized to support a completion switch and actuating mechanism therefor, which will be presently explained in detail, and the deck 213 may provide a support for a plurality of switches which prevent incorrect shifting of the lever 22 and may be conveniently referred to as "inhibitor" switches.

In Figure 8 of the drawings I show the deck 212 as having an opening 214, through which the shifter lever 22 extends, and also having an H-like opening 215 having portions corresponding with the four transmission positions A, B, C, R and a transverse opening or neutral space N. The shifter lever 22 has an arm 215' extending laterally therefrom and provided with pins 216 and 217. The pins 216 and 217 are spaced apart to correspond with the lateral spacing of the transmission positions B and C.

A completion switch 218 is supported on the deck 212 and has normally closed circuit controlling contacts 219. For a purpose which will appear hereinafter, it is desirable to have the completion switch opened and immediately reclosed as each shift of the lever 22 is completed. For this purpose I provide one of the switch elements with an extension 220 which has a contact part 221 formed of insulating material and adapted to be engaged by one arm of a swinging pawl or lever 222. A lever 223 is also pivoted on the deck 212 and has a lug 224 projecting therefrom for wiping contact with the pawl 222. An offset portion 225 of the lever 223 is arranged to overlie the gear ratio position B so that it must be engaged by either the pin 216 or the pin 217 when the shift lever is moved forwardly by the link 182. Another lever 226 is pivoted on the deck 212 and has one arm thereof connected to the lever 223 by a link 227. The other arm 228 of the lever 226 overlies the high speed position C, so that it must necessarily be engaged and moved by either the pin 216 or the pin 217 when the shift lever 22 is moved rearwardly by the link 182. A tension spring 229 has one end thereof anchored to the deck and the other end connected to the lever 223. This spring normally holds the lever 223 against the stop 230 and thereby retains the lever portions 223 and 228 in the positions just explained above. When either lever is engaged and swung by one of the shift lever pins, the lever projection 224 wipes across the pivoted pawl 222 and rotates the latter to cause the contacts 219 of the completion switch to be opened and immediately released for reclosing. A small spring (not shown) acts on the pawl 222 to normally return the same to position shown in Figure 8.

I have mentioned above that a plurality of switches are mounted on the deck 213, and in Figure 3 of the drawings I show a diagrammatic arrangement of these switches. These switches are five in number, one being provided for the neutral position and one for each of the four different transmission settings or ratio positions. In Figure 3 the four ratio position switches are designated 231, 232, 233 and 234, and the neutral position switch is designated 235. Inhibitor switch 231 has normally closed contacts 236 and has a projecting arm 237 provided with an insulating contact part 238 adapted to be engaged by the shift lever 22 to cause opening of the switch when the latter is moved to the first speed position A. The inhibitor switch 232 is normally open, as shown in the drawings, but has a projecting arm 239 with an insulated contact part 240 adapted to be engaged by the shift lever to cause closing of the switch when the lever is moved to the second speed position B. Switch 233 has normally closed contacts 241, and a projecting arm 242 provided with a contact part 243 formed of insulation to be engaged by the shift lever 22 to cause opening of the switch when the lever is moved to the high speed position C. Similarly, the inhibitor switch 234 has normally closed contacts 244, and a projecting arm 245 provided with a contact part 246 formed of insulating material adapted to be engaged by the shift lever to cause opening of the switch when the shift lever is moved to the reverse position R.

The switch 235, which also acts as a completion switch when the operator initiates a shift of the lever 22 into the neutral position by actuation of the hereinafter described switch 255, is so arranged that the normally closed contacts 247 thereof will be opened whenever the shift lever is moved into the neutral position and will be held open as long as the shift lever remains in any part of the neutral slot N. This desired result may be obtained as by arranging the switch 235 so that some part thereof will be engaged by the shift lever or a member actuated thereby whenever the shift lever moves into the neutral slot.

The completion switch 218, but without the actuating means therefor, has been included in the diagrammatic circuit arrangement of Figure 3 to facilitate the explanation of the circuits which will be traced hereinafter.

In addition to the switches already mentioned, I provide another inhibitor switch 250 adjacent the clutch pedal, or equivalent member, and which is arranged to be actuated upon the occurrence of a predetermined disengaging movement of the clutch. This switch has normally closed contacts 251 and a projecting arm 252 carrying a contact part 253 formed of insulating material. The inhibitor switch 250 is arranged relative to the clutch operating pedal or lever so that movement of such member in a direction to disengage the clutch will cause the same to engage the contact part 253 to open the switch contacts 251. In all cases I provide for operation of this inhibitor switch such that the switch will be opened whenever the clutch is disengaged and will be closed whenever the clutch has been reengaged.

At some point available in the driver's compartment 20, such as on the instrument board 21, I provide a pair of manually operable switches 254 and 255. These switches provide means for manually selecting a desired shift and establishing electric control circuits which initiate the automatic performance of the shift. These control switches 254 and 255 may comprise lever-like members 256 and 257 formed of insulating material and mounted upon a panel 258 also formed of insulating material. The lever 256 is adapted to be swung about a pivot 259 and is normally held in the position shown in Figure 3 by the tension 260. The lever 257 is adapted to be swung about a pivot 261, but is normally held in engagement with the stop 262, as shown in Figure 3, by the tension spring 263.

The switch lever 256 carries contact plates 265 and 266, the plate 265 preferably having a recess 267 formed in the edge thereof. A pair of contact arms 269 and 270 are mounted on the insulating panel 258 at opposite sides of the pivot 259. The contact arm 269 bridges over the contact plate 265 and has an end part 271 forming a contact element which is disposed in the opening 267 when the switch lever 265 is in the position shown in Figure 3. Swinging movement of the switch lever 256 in either direction causes the end part 271 of the switch arm 269 to make electric contact with the contact plate 265. The contact arm 270 constitutes a jumper or bridge member which engages and electrically connects the contact plates 265 and 266 whenever the switch lever 256 is swung toward the right.

A contact arm 272 is mounted on the insulating panel 258 and normally engages the contact plate 266 when the switch lever 256 is in the position shown in Figure 3, but when the switch lever is swung toward the left the contact plate 266 moves out of electric contact with the contact arm.

The switch lever 257 has a pair of spaced contact plates 273 and 274 mounted thereon, and the insulating panel 258 has four contact fingers 276, 277, 278 and 279 mounted thereon with the free ends thereof overlying the switch lever. When the switch lever 257 is in the position shown in Figure 3, the contact finger 276 electrically engages the contact plate 274 and the contact finger 277 electrically engages the contact plate 273. Upon swinging movement of the switch lever 257 toward the right, the contact plate 274 moves beneath the contact finger 277 and into electrical engagement therewith. At this time the contact plate 273 moves out of engagement with the contact finger 277 and into engagement with the contact finger 278. In this connection it will be noted that the contact plate 274 is made of sufficient size to remain in electrical engagement with the contact finger 276 during the swinging of the switch member 257 and thus forms a means for electrically connecting the contact fingers 276 and 277. The contact finger 279 is connected with the conductor 351 by a lead 278' and is arranged to be engaged by an angularly extending arm portion 279' of the contact plate 273 when the switch lever 257 is swung to the right.

The circuits controlled by the dash switches 254 and 255 will be explained in detail hereinafter, but for the present it is sufficient to explain that upon movement of the switch lever 256 toward the left the apparatus is rendered automatically operable to move the shift lever 22 into first or second speed positions A or B, depending upon whether the lever 22 is in position B, C, or R at the time the lever 256 is thus moved. When the switch lever 256 is swung toward the right, the automatically operating mechanism will cause the lever 22 to be shifted either into high speed or into reverse. Whether the shift is into the high speed C or reverse position R is determined by whether the shift lever is in second speed position B or first speed position A.

If the shift lever 22 is in the right-hand portion of neutral position N a movement of switch lever 256 toward the left will put the shifter lever into first speed position A, while a movement of this switch lever 256 toward the right will put the shifter lever into third speed position C. When the shift lever 22 is in the left-hand portion of the neutral slot N a movement of switch lever 256 toward the left will put the shift lever into second speed position B, while a movement of the switch lever toward the right will cause the shift lever to be moved to reverse position R.

Whenever the operator swings the switch lever 257 toward the right, and holds it there until the shift is completed, the automatic mechanism is caused to shift the lever 22 into its neutral position. To establish the circuits required to initiate and carry out this shift into neutral it is necessary that the switch lever 256 be swung to the left at the same time that the switch lever 257 is swung to the right.

For causing this simultaneous movement of the switch lever 256 I provide a suitable operating connection to the switch lever 257, which connection may include a pin 254' carried by switch lever 256 and a dog 256' actuated from the switch lever 257. The dog 256' may be in the form of a bell crank lever pivoted on a suitable stationary support 258' and having one arm connected with the switch lever 257 by a link 255'. When the switch lever 257 is swung to the right, the dog 256' will engage the pin 254' and cause the switch lever 256 to be swung to the left at the same time. However, when the switch lever 256 is actuated by the driver to cause one of the above mentioned shifts, the pin 254' does not engage the dog 256' and hence no motion is transmitted to the switch lever 257. If desired, the pin 254' may be extended upwardly or downwardly from the switch lever 256 to form an available actuating part to be engaged by the operator's finger or hand.

In addition to the switches already described, I provide two shift throttle switches 280 and 281. These switches may be suitably supported and located adjacent the shift throttle operating lever 112 so that whenever the shift throttle is in its closed position these switches will be open. The switches 280 and 281 have contacts which close whenever the shift throttle is opened. Any suitable actuating means may be provided for the switches 280 and 281 to accomplish this desired result.

A suitable current source may be provided, such as the storage battery 283, for supplying electric current to energize the various circuits. The battery may be the storage battery usually provided on a motor vehicle and may have one terminal thereof grounded to the frame of the vehicle through the conductor 284. The other terminal of the battery may be connected with the usual ignition switch 285 by a conductor 286. A conductor 287 leads from the ignition switch 285 to the usual ignition circuit, and a conductor 288 leads from the ignition switch to a master switch 289. When this master switch is closed current is available for the various control circuits but when this switch, or the ignition switch, is open the apparatus is disabled.

Before proceeding with a detailed description of the operation of my change-speed apparatus, it might be well to further point out briefly the functions of the various electric switches which have already been referred to. The synchronizing switch 131 controls the circuit for the gate operating solenoid 201 and prevents the gate 200 from being actuated except when a shift of the lever 22 is about to be made. When a shift is about to be made the switch 131 is closed by the outward movement of the valve 123 and permits the gate operating solenoid 201 to be energized, provided certain other switches in the gate solenoid circuit are then closed.

The holding switch 134, when closed by movement of the lever 126 corresponding with an outward movement of the valve 123, establishes a holding circuit for the solenoid 124. The purpose of the holding circuit is to retain the valve 123 in its outward or open position even after the initial circuit is broken, so that the diaphragm 101 will be retained in its innermost position and the shift throttle 43 will be thereby held in its closed position until the shift has been completed.

As above explained, the completion switch 218 is momentarily opened, and immediately reclosed, upon the completion of the movement of the lever 22 to any one of the four settings A, B, C, and R. When the completion switch is opened it breaks the holding circuit for the solenoid 124 and allows the valve 123 to be moved inwardly to its closed position by the action of the spring 129, whereupon the diaphragm spring 106 moves the rod 104 outwardly to disengage the cam 108 from the bell crank lever 110, thereby allowing the spring 146 to reopen the shift throttle 43. Outward movement of the rod 104 is also transmitted through linkage 119, 116 and 115 to the valve 150 to cause operation of the device 31 for reengaging the clutch and for disconnecting the cylinder 156 of the shifter unit 154 from the intake manifold suction.

The switches 85 and 86 of the brain unit are "up" shift switches and the switch 87 of the brain unit is a "down" shift switch. When the switches 85 and 86 are closed at the same time, they cause the solenoid 124 to be energized, which results in outward movement of the valve 123 and flexing of the diaphragm 101 to cause the shift throttle 43 to be closed and the vacuum valve 150 to be opened. Whenever the switch 87 is closed it also causes the solenoid 124 to be energized to close the shift throttle and open the vacuum valve 150 in the manner just explained above.

The switches 231, 232, 233, and 234 and the clutch switch 250 have all been referred to above as inhibitor switches. When the shift lever 22 is in first speed position A it holds the inhibitor switch 231 open and thereby prevents the apparatus from attempting to make a further down-shift. Similarly, the switch 233 is held open when the lever 22 is in the high speed position C and prevents the apparatus from attempting to make a further up-shift. The switch 232, as explained above, is normally open and is closed only when the lever 22 is in the second speed position B. When the shift lever 22 is in second speed position B the circuits for either an up-shift or a down-shift can be completed. The switch 234 is held open whenever the lever 22 is moved to the reverse position R, and whenever this switch is open the apparatus is rendered incapable of making any automatic shift.

The switch 235 is opened whenever the lever 22 is moved into neutral position, and when certain circuit connections have been made as explained hereinafter this switch acts as a completion switch for a desired shift into neutral position. So long as this switch is held open as the result of such a desired shift into neutral position, the apparatus is also rendered incapable of making any automatic shift.

The inhibitor switch 250 which is associated with the clutch pedal 34 or equivalent member is normally closed, but whenever the clutch is disengaged this switch is opened and so long as it remains open it renders the apparatus incapable of initiating any automatic shift.

The switch 280 which is referred to above as a shift throttle switch, is also a control switch for the energizing circuit of the gate operating solenoid 201. This switch is closed only when the shift throttle is open which means that preparatory to a shift being made this switch is in closed condition to permit energizing of the gate solenoid. Upon the initiating of a shift the shift throttle normally closes, and upon so doing it opens the switch 280 which causes deenergization of the gate solenoid circuit so that the gate can be retracted by the movement of the lever 22 in completing the shift.

The switch 281, which is likewise referred to as a shift throttle switch, is also closed only when the shift throttle is open. The purpose of this switch is to open the signal or control circuit so that an automatic shift will not be called for as the shift throttle is reopening, since at that time the vacuum and velocity in the intake do not reflect only the conditions of load and speed but are affected by the position of the reopening shift throttle.

To explain the operation of my automatic speed change apparatus more in detail, let it be assumed that the engine of the vehicle is running and that the master switch 289 has been closed so that current from the battery 283 will be available for energizing the various circuits. Let it also be assumed that the vehicle is standing still and that the shifter lever 22 is in the right-hand neutral position. With the shift lever in this position it will be remembered that the inhibitor switch 235 is held open and so long as this switch remains open automatic operation will not take place, even though the engine speed is varied by opening or closing of the throttle.

When the operator wishes to cause forward travel of the vehicle he moves the switch lever 256 toward the left and releases it. This causes the contacts of the switch 255 to establish an energizing circuit for the solenoid 124, which results in the valve 123 being opened by the solenoid and in the synchronizing switch 132 and the holding switch 134 being closed as the valve 123 is moved to its open position. The opening of the valve 123 causes the intake suction to actuate the diaphragm 101, which results in the shift throttle 43 being closed by the inward movement of the rod 104 and the cam 108. The inward movement of the rod 104 also causes motion to be transmitted through the link 119, the rock shaft 116 and the link 115 to the valve element 150. The motion thus imparted is in a direction to cause outward movement of the valve element 150 which results in the cylinder 31 of the clutch operating unit 30 being connected with the intake manifold through the conduit 148. Thereupon the piston of the clutch cylinder 31 is moved inwardly and causes the lever 152 to actuate the clutch shaft 32 in a direction to disengage the clutch. This movement of the clutch lever 152 causes motion to be transmitted through the link 173 to the lever 170 which causes outward movement of the valve element 165. This movement of the valve element 165 causes the cylinder 156 of the shifter operating unit 35 to be connected with the intake manifold through the conduits 163, 166 and 148, and to be closed to the atmosphere. This results in inward movement of the piston 157 of the shift cylinder and causes motion to be transmitted to the shift lever 22 through the snap action device 155 and the link 182 to thereby move the lever 22 to the first speed position A. During this operation the "leaky" check valve 161 causes the inward or power stroke of the piston 157 to take place at a desired relatively slow rate but permits the return stroke of the piston to take place rapidly. In Figure 3 of the drawings I show the shift lever 22 in the neutral position, and in Figure 5 I show the relative positions of the parts of the snap action device 155 just prior to the movement of the shift lever to the first speed position. Figure 4 shows the shift lever 22 and the other parts after the shift from neutral to first speed has been completed.

As the lever 22 moves into first speed position A, the completion switch 218 is opened momentarily to break the holding circuit and cause deenergization of the solenoid 124. Deenergization of this solenoid allows the valve 123 to move inwardly to its closed position and allows the shift throttle to be reopened and the vacuum valve 150 to be closed to the manifold and opened to the atmosphere. The movement of the lever 22 into the first speed position A also causes opening of the inhibitor switch 231 which, as explained above, will prevent the apparatus from attempting to shift to a higher transmission ratio position even should the operating conditions of the vehicle indicate the need for such shift. This is desirable since the transmission is now in its highest transmission ratio position.

With the vehicle now traveling ahead in first speed the operator simply depresses the accelerator to increase the speed of the vehicle, and as the vehicle speed increases a condition is reached where the engine is operating at a relatively high speed and the flow of fluid through the intake conduit 42 is taking place at a relatively high velocity. As soon as the intake velocity and vacuum increase above predetermined values the diaphragms 48 and 51 are flexed toward each other, thereby causing the switches 85 and 86 to be closed. When this occurs the solenoid 124 is energized and the same operation as above explained is repeated to cause closing of the shift throttle 43, disengagement of the clutch by operation of the clutch cylinder 31, and shifting of the lever 22 into the second speed position B by the operation of the shift cylinder 156. Movement of the lever 22 into second speed position B momentarily opens the completion switch 218 for the purpose above explained, and also causes closing of the gate inhibitor switch 232 so that a succeeding shift, either upwardly or downwardly as determined by the brain unit, can be made automatically. It will be noted that at this time the other inhibitor switches 231, 233, and 234 are all closed.

Since the operator is holding the accelerator of the vehicle in a depressed condition, the speed of the engine and of the vehicle again begins to increase immediately following the shifting of the lever 22 into the second speed position B. When the speed of the engine has increased to the point where the intake velocity and the vacuum are again above the predetermined values, the diaphragms 48 and 51 are again flexed and the switches 85 and 86 are closed, thereby to initiate a further "up" shift of the lever 22. This shift is carried out in substantially the manner just explained above except that during this shift the gate solenoid 201 is energized and the gate 200 is closed. The shift is completed by movement of the lever 22 into the high speed position C, which causes momentary opening of the completion switch 218 and opens the inhibitor switch 233, and results in deenergization of the solenoid 201 and retraction or opening of the gate 200.

During the travel of the vehicle with the shift lever 22 in the high speed position C, let it be assumed that the load on the vehicle increases in such a manner as might occur when the vehicle climbs a steep grade. The increased load causes a slowing down of the engine in spite of the operator depressing the throttle to increase the fuel supply. The condition of operation now is that the engine is exerting maximum torque at slow speed and the throttle is practically wide open. In this condition of operation the engine is overloaded and as soon as the vacuum in the intake falls below a predetermined value, as the result of this existing condition, the diaphragm 51 is flexed in the opposite direction, that is, away from diaphragm 48 by the compression spring 75. This movement of the diaphragm 51 causes the switch 87 to be closed. The closing of the switch 87 causes energization of the solenoid 124, which results in the operation of the shift throttle 43, the clutch device 31 and the shift cylinder 156, in timed relation to produce a down-shift of the lever 22 from the high speed position C to the second speed position B. The completion of the shift causes momentary opening and immediate reclosing of the completion switch 218 and the closing of the inhibitor switch 232.

If the overload condition continues after the down-shift from the high speed position C to the second speed position B, a second downshift will be automatically brought about to cause the lever 22 to be shifted from the second speed position B to the first speed position A. During this shift the gate solenoid 201 is not energized and consequently the gate 200 is not closed. If the overload condition ceases and the engine speed again builds up, an automatic shift will be made from the first speed position A back to the second speed position B in the manner explained above.

For connecting the various electric switches and solenoids of my speed change apparatus, I provide a network of conductors whereby the required electrical circuits can be established. In this network of conductors I provide a point or connection X so arranged that, when this point is connected to ground by any one of various circuits, the solenoid 124 will be energized and a shift of the lever 22 will be automatically made. For example, when the lever 22 is to be shifted from neutral into first speed position A, as in the case of the example explained above, the lever 256 of the dash control switch 254 is moved toward the left. This movement of the switch lever causes the contact arm 269 to make contact with the plate 265, and this establishes an energizing circuit for the solenoid 124. This circuit can be traced from the ground connection 350 through contact arm 269 and contact plate 265, through conductor 351 to point X, and then through switch 281 and conductor 352 to the winding of the solenoid 124. From this winding the circuit continues through conductor 353, master switch 289, conductor 288, ignition switch 285, and conductor 286 to the battery 283, and then through ground connection 284.

As explained above, the operation of the valve 123 by the solenoid 124 causes the synchronizing switch 131 and the holding switch 134 to be closed. The closing of the switch 134 establishes a holding circuit for the electromagnet 124. This holding circuit may be traced as follows: From ground connection 355 through the contact plate 273 of the dash switch 255, through contact arm 277 and through conductor 356 to completion switch 218, then through conductor 357, through holding switch 134 to the solenoid winding 128 and then back to ground through conductor 353, switch 289, conductor 288, switch 285, and conductor 286 and the battery 283.

In the case of each shift made by the apparatus, this holding circuit remains energized until the completion of the shift, whereupon the momentary opening of the completion switch 218 in the manner explained above, deenergizes the holding circuit and the solenoid 124 to allow the shift throttle 43 to be reopened and the valve 123 to be moved to its inward position. The deenergizing of the holding circuit and the immediate reclosing of the completion switch at the completion of each shift restores the electric control mechanism and circuits to a condition of readiness for the next shift to be made.

Assuming now that the shift lever 22 has been moved to the first speed position A and that the diaphragms 48 and 51 of the brain unit have been flexed in response to changes in the operating conditions to close switches 85 and 86 and to cause a shift from the first speed position A to the second speed position B, a control circuit is thereby established as follows: From ground connection 358 through the normally closed clutch switch 250, through the reverse position inhibitor switch 234, through neutral position inhibitor switch 235, through third speed position inhibitor switch 233, and then through conductor 359 to switch 86, through conductor 360, and through switch 85, and thence to point X through conductor 361. Since point X has now been grounded, the solenoid 124 will be energized and the shift will be automatically made from the first speed position to the second speed position B.

When the shift lever 22 is in second speed position B and the brain unit calls for an "up" shift to high speed position C, the control circuit established is as follows: From ground connection 358 through clutch pedal switch 250 and thence through switches 234, 235, and 233 in succession, and then through conductor 359, switches 85 and 86, lever 77, conductor 76 and a conductor 361 to point X. The circuit thus established energizes the solenoid 124 to initiate the shift. At the time that this circuit is established, it will be noted that the shift lever 22 is holding the inhibitor switch 232 closed. At this time the gate 200 must be moved forwardly to prevent the shift lever from passing through the neutral space when the shift from second speed position B to high speed position C is to be made.

The desired forward movement of the gate 200 is caused by energization of the solenoid 201 which is brought about by the closing of the synchronizing switch 131. The energizing circuit for the gate solenoid may be traced as follows: From ground connection 358 through switches 250, 234, 235 and 233 in succession, a portion of the conductor 359, a conductor 359', the switch 87, the contact portion 82' of the then closed switch 88, the contact 83' of said switch 88, the conductor 88', and then through shift throttle switch 280 and conductor 362, and then through synchronizing switch 131, conductor 363, and through inhibitor switch 232, then through conductor 364 and contact plate 266 of switch 254, and then through contact arm 272, conductor 365 to the winding of the solenoid 201, and then back to ground through conductor 366, switch 289, conductor 288, switch 285, conductor 286, and battery 283.

When the shift lever 22 is in high speed position C or second speed position B, and the brain unit calls for a "down" shift, the following circuit is established for grounding the point X to cause energization of the solenoid 124: From ground connection 358 through clutch pedal switch 250, then through inhibitor switches 234, 235, and 231 in succession, and then through conductor 367 and through switch 87, the lever 77, conductor 76 and the conductor 361 to point X.

When the shift lever 22 is in any one of the four positions A, B, C, and R, a shift can be made to put this lever in neutral position by simply swinging the lever 257 of the dash switch 255 to the right. The circuit thus established may be traced as follows: From ground through conductor 355 to switch plate 273 and the arm 279' thereof, then through contact finger 279, conductor 278', and conductor 351 to point X. The point X having thus been grounded, a shift is thereupon initiated, which includes the completing of the holding circuit for the solenoid 124. In initiating the shift, the operator moves the switch lever 255 to the right to establish the above circuits and holds this lever in such right-hand position until the shift to neutral position has been completed.

Since the desired shift is to neutral position, the neutral switch 235 must be included in a circuit such that it will serve as a completion switch and cause the shift to end upon the opening thereof by the movement of the shift lever 22 into the neutral slot N. This latter circuit may be traced as follows: From battery 283, through conductor 286, switch 285, conductor 288, switch 289, conductor 353, solenoid 124, holding switch 134, conductor 357, switch 218, conductor 356, switch finger 277, switch plate 274, switch finger 276, conductor 356b, neutral switch 235, conductor 356a, switch finger 278, switch plate 273, and back to battery through ground connections 355 and 284. Switch lever 257 has an operating connection with switch lever 256, through the dog 256' and link 255' as explained above, such as to cause the latter switch lever to move to the left when the former switch lever is moved to the right for a shift to neutral. This movement of lever 256 causes switch plate 266 to move out of contact with switch finger 279, which movement prevents the energizing of gate solenoid 201.

From the foregoing description and accompanying drawings it will now be readily understood that I have provided novel speed control apparatus which is efficient, sensitive, and practical, and which embodies novel mechanical devices and control circuit arrangements for initiating and carrying out desired or needed changes in the power transmission ratio.

I claim:

1. In an automotive vehicle provided with a change-speed transmission and an internal combustion engine having an intake and a throttle valve, power means for operating said transmission comprising control means including a multi-chambered casing housing a plurality of pressure differential and spring-operated switch-operating members and means for controlling the operation of said members comprising a conduit interconnecting one of the chambers of said casing with the intake, said conduit having incorporated therein a restricting automatically shiftable check valve means and further comprising means, having a fluid transmitting passage therein of relatively small diameter, interconnecting another of said chambers with the intake, the aforementioned parts of the control means being so constructed and arranged that when the throttle is suddenly opened the aforementioned passage and valve means serve to so control the flow of fluid into two of said compartments as to prevent one of said switch-operating members from being subjected to a certain differential of pressures, the aforementioned parts of the control means being also so constructed and arranged as to so control the flow of fluid from the aforementioned two compartments as to prevent the latter switch-operating member from being subjected to said differential of pressures.

2. In combination, an internal combustion engine having an intake and a throttle, a transmission having a plurality of shifts corresponding with different power transmission ratios, means for shifting from one ratio to another and control means, including a multi-chambered unit, operable in response to changes in intake pressure and velocity for automatically determining whether the shift from one ratio to another should be made, said latter means including means, comprising a conduit having a restricting valve automatically shiftable therein interconnecting the intake with one of the chambers of said unit, for so controlling its operation as to prevent all undesired shift control operations thereof when the throttle is either suddenly opened or suddenly completely closed.

3. In combination, an internal combustion engine having an intake and a throttle, a transmission having a plurality of shifts corresponding with different power transmission ratios, means for shifting from one ratio to another and control means, including a multi-chambered unit, operable in response to changes in intake pressure and velocity for automatically determining whether the shift from one ratio to another should be made, said latter means including means, comprising a pressure differential and spring-operated restricting valve incorporated in a conduit interconnecting the intake with one of the chambers of said unit, for so controlling its operation as to prevent all undesired shift control operations thereof when the throttle is either suddenly opened or suddenly completely closed.

4. In combination, an internal combustion engine having an intake, a transmission providing a plurality of power transmission ratios, automatically operable means for shifting from one ratio to another including a power device, a control for said power device, and means operated automatically in response to changes in intake pressure and velocity for actuating said control, said actuating means comprising a multi-chambered unit and two separate fluid transmitting and fluid flow control means interconnecting said unit with the intake, one of said latter means comprising a conduit having a valve, including a pressure differential operable valve member, incorporated therein.

5. In an automotive vehicle provided with a change-speed transmission and an internal combustion engine comprising an intake and a throttle valve for in part controlling the flow of fluid through said intake, power means for operating the transmission comprising control means, said means including a multi-chambered casing housing two switch-operating spring and pressure differential operated members said members, together with the casing, outlining a central chamber and two end chambers, a fixed switch contact comprising two plates housed within the central chamber and secured to the casing, a movable contact secured to one of said pressure differential operated members said movable contact, together with one of the plates of the aforementioned switch contact, providing a switch, a fixed contact secured to one end of the casing said contact, together with the aforementioned movable contact, providing another switch, another movable contact secured to the other of the pressure differential operated members said contact, together with the other of the plates of said first mentioned switch contact, providing another switch, a spring for biasing one of said spring and pressure differential operated members to its switch open position and another spring for biasing the other of said spring and pressure differential operated members to a position to open one of the aforementioned switches and close another of said switches, and means for in part controlling the operation of said switch operating members, said means including fluid transmitting means interconnecting the intake with the aforementioned central chamber said fluid transmitting means having a part thereof bored to provide a passage of relatively small diameter and further including a fluid transmitting conduit interconnecting the intake with one of the aforementioned end chambers, said conduit having incorporated therein an automatically shiftable restricting valve, the parts of the control means being so constructed and arranged and so operative that when the throttle is suddenly opened, one of said switches being then open and the other two being closed, the aforementioned small diametered passage together with the restricting valve serve to so control the flow of fluid into the central chamber and last mentioned end chamber respectively that there results an opening of the switch that is then closed said operation taking place before one of the remaining switches is closed.

6. Control means constituting a part of means for operating the change-speed transmission of the power plant of an automotive vehicle said power plant also including an internal combustion engine having an intake passage, said control means comprising a casing having three sections housing two pressure differential operated mediums, said mediums together with the casing providing three separate chambers, fluid pressure transmitting means connecting two of said chambers with said intake and the third chamber with atmosphere for subjecting said mediums to pressure differential, a switch contact member secured to the central section of said casing and housed within the central chamber of the aforementioned three chambers, electrical conductor means including a switch contact member secured to one of said pressure differential operated mediums and further including a conductor member adjustably secured to said central section of the casing, electrical conductor means including a switch contact member secured to the other of said pressure differential operated mediums and further including another conductor member adjustably secured to said central section of the casing and a switch contact member adjustably secured to one of the end sections of said casing.

7. In combination, an internal combustion engine having an intake and a throttle valve, a transmission providing a plurality of power transmission ratios, automatically operable means for shifting from one ratio to another, and means operable automatically in response to changes in intake pressure and velocity for controlling the first mentioned automatic means, said actuating means including a unit having three chambers therein, the gaseous pressure within two of said chambers being controlled to effect the desired operation of the actuating means and means interconnecting two of the chambers of said unit with the intake comprising fluid transmitting means having a portion thereof bored to provide a passage of relatively small diameter and further comprising a conduit having incorporated therein an automatically shiftable restricting valve, said passage and restricting valve cooperating to prevent the creation of an undesired differential of gaseous pressures in said two chambers when the throttle valve is either suddenly opened or suddenly completely closed.

8. In an automotive vehicle provided with a change-speed transmission and an internal combustion engine including an intake provided with a Venturi tube and further including a throttle valve housed within said intake, power means for operating the transmission comprising control means, said latter means including a casing having three compartments therein each compartment being outlined by a portion of the casing and a spring and pressure differential operated switch operating power element, fluid transmitting means, including an automatically shiftable restricting valve, interconnecting one of said compartments with a portion of the intake and another fluid transmitting means, having a portion thereof bored to provide a passage of relatively small diameter, interconnecting another of said compartments with the throat of the Venturi tube, the parts of said fluid transmitting means being so constructed and arranged and so operative that with a normal operation of the throttle valve the differential of gaseous pressures within the aforementioned two compartments is determined by the rate of flow of fluid through said intake; however, when the throttle valve is either suddenly opened or suddenly completely closed the differential of gaseous pressures within said two compartments is determined by the relative rates of flow of fluid through said fluid transmitting means.

9. In combination, an internal combustion engine having an intake, a transmission providing a plurality of power transmission ratios, automatically operable means for shifting from one ratio to another including a power device, a control for said power device, and means operated automatically in response to changes in intake pressure and velocity for actuating said control, said actuating means comprising a multi-chambered unit and two separate fluid transmitting and fluid flow control means interconnecting said unit with the intake, one of said latter means comprising an automatically operable restricting valve and other of said latter means comprising means having a portion thereof bored to provide a passage of relatively small diameter.

KARL B. BRITTON.

REFERENCES CITED

The following references are of record in the file of this patent:

UNITED STATES PATENTS

| Number | Name | Date |
|---|---|---|
| 1,845,818 | Spiller | Feb. 16, 1932 |
| 2,120,104 | Livermore | June 7, 1938 |
| 2,133,548 | Lassiter | Oct. 18, 1938 |
| 2,187,824 | Britton | Jan. 23, 1940 |
| 2,234,015 | Winkler et al. | Mar. 4, 1941 |
| 2,249,221 | Mosley et al. | July 15, 1941 |
| 2,343,265 | Price | Mar. 7, 1944 |